United States Patent
Maile et al.

(10) Patent No.: US 10,221,532 B2
(45) Date of Patent: *Mar. 5, 2019

(54) SKID SHOE ASSEMBLY FOR A SNOW THROWER

(71) Applicant: Ariens Company, Brillion, WI (US)

(72) Inventors: William D. Maile, De Pere, WI (US); Robert Endter, Reedsville, WI (US); Alex Huss, Neenah, WI (US)

(73) Assignee: Ariens Company, Brillion, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,346

(22) Filed: Apr. 27, 2018

(65) Prior Publication Data

US 2018/0245298 A1    Aug. 30, 2018

Related U.S. Application Data

(63) Continuation of application No. 15/054,975, filed on Feb. 26, 2016, now Pat. No. 9,982,404.

(51) Int. Cl.
| | |
|---|---|
| *E01H 5/06* | (2006.01) |
| *E01H 5/09* | (2006.01) |
| *B62B 17/02* | (2006.01) |
| *B62B 19/00* | (2006.01) |

(52) U.S. Cl.
CPC ............ *E01H 5/066* (2013.01); *B62B 17/02* (2013.01); *E01H 5/098* (2013.01); *B62B 19/00* (2013.01)

(58) Field of Classification Search
CPC .......... E01H 5/066; E01H 5/098; B62B 17/02
See application file for complete search history.

(56) References Cited

U.S. PATENT DOCUMENTS

| | | | | |
|---|---|---|---|---|
| 1,581,414 | A * | 4/1926 | Young ................... | E02F 3/8157 172/393 |
| 1,887,451 | A * | 11/1932 | Dombrowski .......... | E01H 5/066 172/387 |
| 2,202,309 | A * | 5/1940 | Campbell ............... | B62B 19/00 280/28 |
| 2,525,971 | A * | 10/1950 | Stone ................... | A47B 88/437 16/97 |
| 2,593,025 | A * | 4/1952 | Hanson ................... | B62B 15/00 280/28 |
| 2,611,979 | A * | 9/1952 | Weller .................... | E01H 5/066 280/28 |
| 2,768,453 | A * | 10/1956 | Adams, Jr. ................ | E01H 5/04 37/252 |
| 2,983,058 | A * | 5/1961 | Hertz ...................... | E01H 1/105 172/14 |

(Continued)

FOREIGN PATENT DOCUMENTS

CA          2639359          2/2010

*Primary Examiner* — Jamie L McGowan
(74) *Attorney, Agent, or Firm* — Michael Best & Friedrich, LLP (57) ABSTRACT

A skid shoe assembly for use on a snow thrower includes a bracket having a mounting portion configured to couple to the snow thrower and a support portion extending generally perpendicular from the mounting portion. The skid shoe assembly also includes a replaceable insert composed of a plastic material. The insert includes an elongated body extending generally parallel to the support portion and configured to engage a ground surface.

16 Claims, 8 Drawing Sheets

(56) References Cited

U.S. PATENT DOCUMENTS

| | | | | |
|---|---|---|---|---|
| 3,217,431 A * | 11/1965 | Heinzroth | ............... | E01H 5/066 172/832 |
| 3,720,421 A * | 3/1973 | Clemmer | ................ | A63C 5/062 180/182 |
| 3,778,074 A * | 12/1973 | Kozlow | ................. | B62B 17/02 280/28 |
| 3,857,578 A * | 12/1974 | Alton | ....................... | B62B 17/02 180/182 |
| 4,073,076 A * | 2/1978 | Fortune | ................... | E01H 5/066 293/49 |
| 4,290,214 A * | 9/1981 | Stepe | .................... | E02F 9/2808 172/701.2 |
| 4,346,528 A | 8/1982 | Shwayder | | |
| 4,441,266 A | 4/1984 | Westimayer | | |
| 4,450,635 A * | 5/1984 | Shwayder | ............... | E01H 5/061 228/189 |
| 4,500,766 A * | 2/1985 | Reinhardt | .............. | B23K 11/00 172/719 |
| 4,607,781 A | 8/1986 | Shwayder | | |
| 4,737,039 A * | 4/1988 | Sekerich | ............... | A47B 88/493 384/18 |
| 4,756,102 A * | 7/1988 | Chapman | ................. | E01H 1/04 172/719 |
| 4,936,392 A * | 6/1990 | Kitchin | ................... | E02F 3/769 172/815 |
| 5,438,770 A | 8/1995 | Miller | | |
| 5,720,353 A * | 2/1998 | Wilkening | ............ | E02F 3/8157 172/747 |
| 5,911,422 A * | 6/1999 | Carpenter | ............... | B62B 3/007 280/10 |
| 8,191,289 B2 * | 6/2012 | Raftery | ................... | E01H 5/045 16/18 B |
| 8,544,856 B2 * | 10/2013 | Sayre | ...................... | E01H 5/098 280/28.17 |
| 8,584,383 B1 * | 11/2013 | Morse | ..................... | E01H 5/098 37/242 |
| 9,133,599 B2 * | 9/2015 | Henning | ................. | E01H 5/066 |
| 9,598,829 B2 * | 3/2017 | Betts | ....................... | E01H 5/098 |
| 9,708,784 B2 * | 7/2017 | Winter | .................... | E01H 5/066 |
| D816,720 S * | 5/2018 | Winter | .......................... | D15/11 |
| 2005/0066553 A1 * | 3/2005 | Light | ....................... | E01H 5/04 37/242 |
| 2010/0236106 A1 * | 9/2010 | Muscarella | ........... | E01H 5/098 37/196 |
| 2011/0315465 A1 * | 12/2011 | Henry | ..................... | E01H 5/098 180/182 |
| 2014/0250739 A1 * | 9/2014 | Distefanis, Jr. | ......... | E01H 5/045 37/260 |

\* cited by examiner

FIG. 12

SKID SHOE ASSEMBLY FOR A SNOW THROWER

CROSS-REFERENCE TO RELATED APPLICATIONS

This application is a continuation of U.S. patent application Ser. No. 15/054,975, filed on Feb. 26, 2016, the entire contents of which are incorporated by reference herein.

BACKGROUND

The present invention relates to utility machines and, more particularly, to skid shoes for utility machines.

Utility machines (e.g., lawn mowers, lawn tractors, trimmers, tillers, snow throwers, etc.) are generally used for outdoor applications such as landscaping, gardening, lawn care, or snow removal. A snow thrower typically includes an auger supported within an auger housing. While removing snow from a surface, the auger housing rests on the surface, and snow is channeled through the auger housing as the snow thrower is maneuvered about the surface. As the auger housing slides along the surface, the auger housing may scrape and mar the surface.

SUMMARY

In one aspect, the invention provides a skid shoe assembly for use on a snow thrower. The skid shoe assembly includes a bracket having a mounting portion configured to couple to the snow thrower and a support portion extending outwardly from the mounting portion. The skid shoe assembly also includes an insert including an annular body having a central aperture and a linear section configured to engage a ground surface. The central aperture receives the bracket so that the annular body is disposed around the mounting portion of the bracket. A portion of the annular body is configured to be captured between the support portion of the bracket and the snow thrower to secure the insert to the snow thrower.

In another aspect, the invention provides a snow thrower including a frame, a prime mover supported by the frame, a handle assembly coupled to the frame, a plurality of wheels rotatably coupled to the frame to facilitate movement along a ground surface, an auger housing coupled to the frame, and an auger disposed in the auger housing. The auger is driven by the prime mover. The snow thrower also includes a skid shoe assembly including a bracket having a mounting portion coupled to the auger housing and a support portion extending outwardly from the mounting portion. The skid shoe assembly also includes an insert including an annular body having a central aperture and a linear section configured to engage the ground surface. The central aperture receives the bracket so that the annular body is disposed around the mounting portion of the bracket. A portion of the annular body is configured to be captured between the support portion of the bracket and the snow thrower to secure the insert to the auger housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
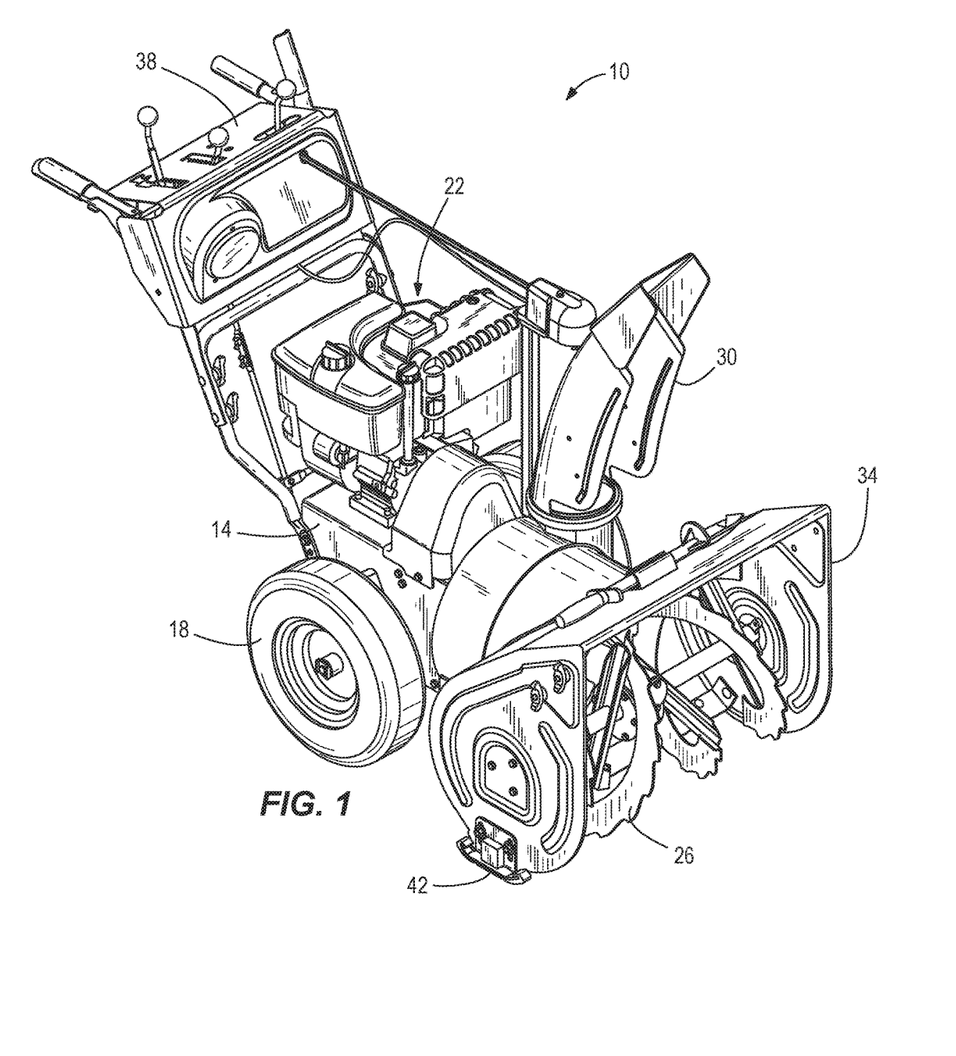
FIG. 1 is a front perspective view of a snow thrower including a skid shoe assembly.

FIG. 1 illustrates a snow thrower 10, which may also be referred to as a snow blower. The illustrated snow thrower 10 includes a frame 14, a plurality of wheels 18, a prime mover 22, an auger 26, and a chute 30. The frame 14 includes an auger housing 34 and an operator control assembly 38. The operator control assembly 38 extends from the frame 14 in a direction opposite the auger housing 34 and includes controls to operate the snow thrower 10. The operator control assembly 38 is also configured to be grasped by an operator to move and maneuver the snow thrower 10 along a ground surface. The wheels 18 are rotatably coupled to the frame 14 to facilitate moving the snow thrower 10 along the ground surface.

The prime mover 22 is supported by the frame 14. The prime mover 22 includes a two-stroke or four-stroke internal combustion engine that is coupled to the auger 26 to drive the auger 26. In other embodiments, the prime mover 22 may include a battery-powered electric motor that is coupled to the auger 26 to drive the auger 26. In some embodiments, the prime mover 22 (whether an internal combustion engine or an electric motor) may also be coupled to the wheels 18 to drive the wheels 18.

The auger 26 is positioned within the auger housing 34 and coupled to the prime mover 22. The auger 26 is operable to be driven (e.g., rotated) by the prime mover 22 to draw snow into the auger housing 34 and push the snow through the chute 30. In the illustrated embodiment, the snow thrower 10 is a two-stage snow thrower including a secondary impeller or fan adjacent the chute 30 that is driven by the prime mover 22 and that throws snow out through the chute 30. In other embodiments, the snow thrower 10 may be a single-stage snow thrower such that the auger 26 both draws snow in and pushes snow out of the snow thrower 10.

The chute 30 is mounted to the frame 14 to direct snow and other material away from the frame 14. The illustrated chute 30 is rotatably mounted above the auger housing 34 of the frame 14. In other embodiments, the chute 30 may be located elsewhere on the frame 14. The chute 30 is rotatable relative to the frame 14 to discharge snow in different directions, as desired by an operator of the snow thrower 10.

The snow thrower 10 also includes two skid shoe assemblies 42 (only one of which is shown in FIG. 1). The skid shoe assemblies 42 are mounted on opposing sides of the auger housing 34. The skid shoe assemblies 42 facilitate moving (e.g., sliding) the snow thrower 10 along the ground surface during operation. The skid shoe assemblies 42 are substantially identical and only one of the assemblies 42 is described in detail below.

Figure 2:
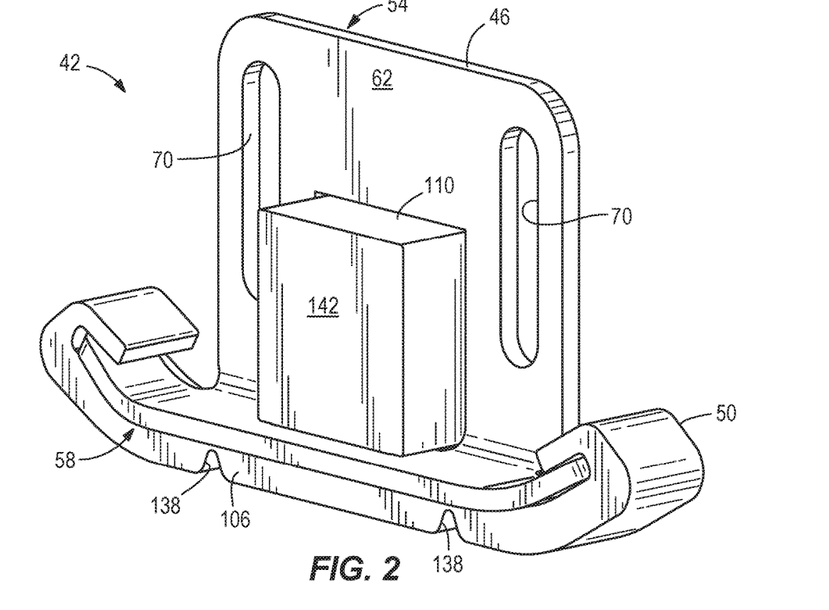
FIG. 2 is a perspective view of the skid shoe assembly shown in FIG. 1.

As shown in FIG. 2, the illustrated skid shoe assembly 42 includes a bracket 46 and a replaceable insert 50. The bracket 46 is configured to couple to the auger housing 34. The replaceable insert 50 is received by the bracket 46 and configured to engage the ground surface. The bracket 46 provides structure and support to the skid shoe assembly 42, whereas the insert 50 is configured to slide across the ground surface without defacing or marring the ground surface. In the illustrated embodiment, the bracket 46 and the insert 50 are composed of different materials. The bracket 46 is composed of a relatively harder, first material, while the insert 50 is composed of a relatively softer, second material. For example, the bracket 46 is preferably composed of metal (e.g., steel, etc.), and the insert 50 is preferably formed of plastic (e.g., nylon, polyethylene, ABS, PVC, etc.). In some embodiments, the insert 50 may be molded from plastic. In other embodiments, the insert 50 may be extruded from plastic. In such embodiments, an elongated extrusion having the profile of the insert 50 may be sliced to desired thicknesses to facilitate mass-manufacturing inserts.

The illustrated bracket 46 includes a mounting portion 54 and a support portion 58. The mounting portion 54 is configured to couple to the snow thrower 10 and, more particularly, the auger housing 34. The mounting portion 54 includes a front face 62 and a rear face 66 (FIG. 4) that is opposite the front face 62. The rear face 66 abuts and contacts the auger housing 34 when the bracket 46 is coupled to the snow thrower 10. The mounting portion 54 further includes a pair of elongated apertures 70 that extends through the front and rear faces 62, 66. Each elongated aperture 70 receives a suitable fastener (e.g., a bolt) (FIG. 1) to couple the bracket 46 to the auger housing 34 of the snow thrower 10. The apertures 70 are elongated to allow vertical adjustment of the bracket 46 relative to the auger housing 34.

Figure 3:
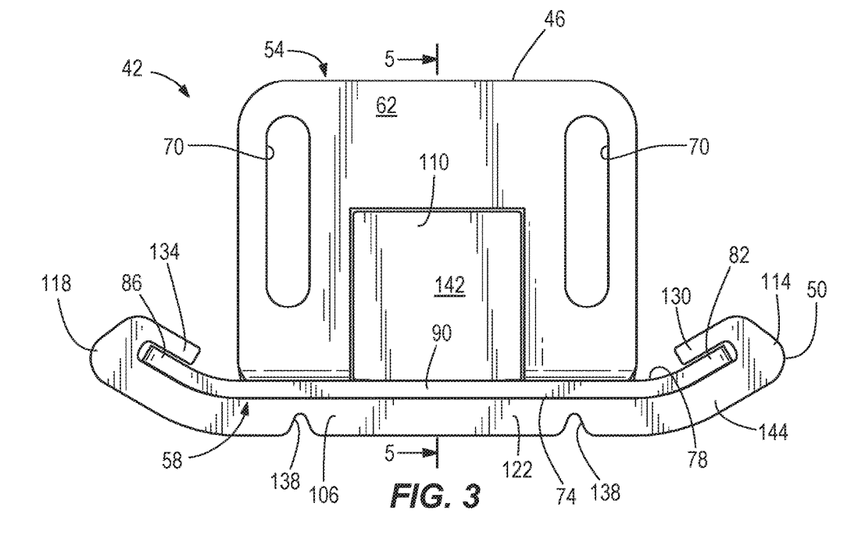
FIG. 3 is a front plan view of the skid shoe assembly shown in FIG. 1.
Figure 4:
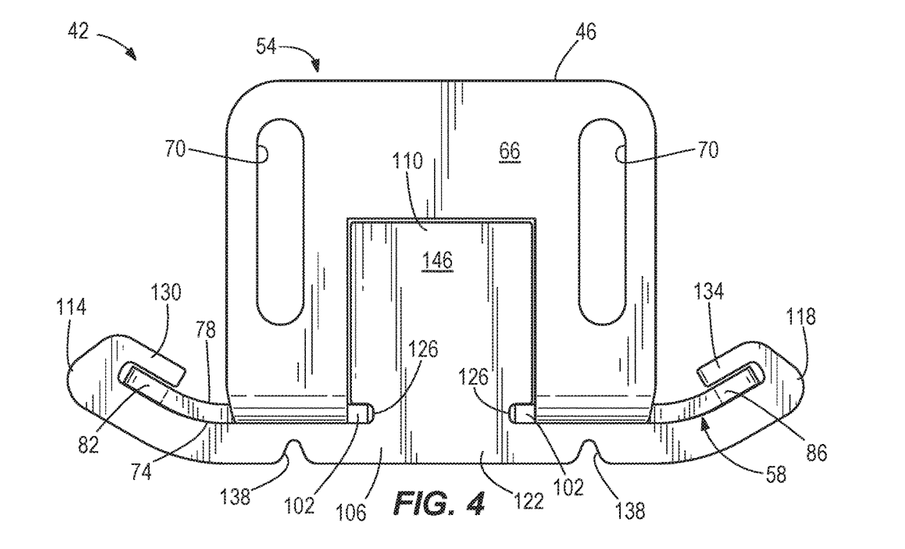
FIG. 4 is a rear plan view of the skid shoe assembly shown in FIG. 1.

With reference to FIGS. 2-4, the support portion 58 of the bracket 46 extends generally perpendicular from the mounting portion 54. In the illustrated embodiment, the bracket 46 is formed (e.g., machined) as a unitary member, and the support portion 58 is bent relative to the mounting portion 54 to achieve the desired orientation. Although the illustrated bracket 46 is constructed as a single piece, in other embodiments, the bracket 46 may be constructed from separate pieces that are secured (e.g., welded) together.

The support portion 58 of the bracket 46 includes a bottom surface 74 and a top surface 78 that is opposite the bottom surface 74. The top surface 78 is configured to at least partially support the replaceable insert 50. The support portion 58 further includes a first end section 82, a second end section 86, and a central section 90 located between the first and second end sections 82, 86. The central section 90 is disposed directly below the mounting portion 54, and extends substantially the same width as the mounting portion 54. Furthermore, the central section 90 is generally planar such that, when the bracket 46 is mounted to the snow thrower 10, the central section 90 is oriented generally parallel to the ground surface. The first end section 82 and the second end section 86 extend outwardly from the central section 90 and are angled relative to the central section 90. In the illustrated embodiment, the first end section 82 and the second end section 86 are oriented at acute angles with respect to the ground surface. In other embodiments, the first end section 82 and the second end section 86 may be oriented at obtuse angles relative to the ground surface.

Figure 6:
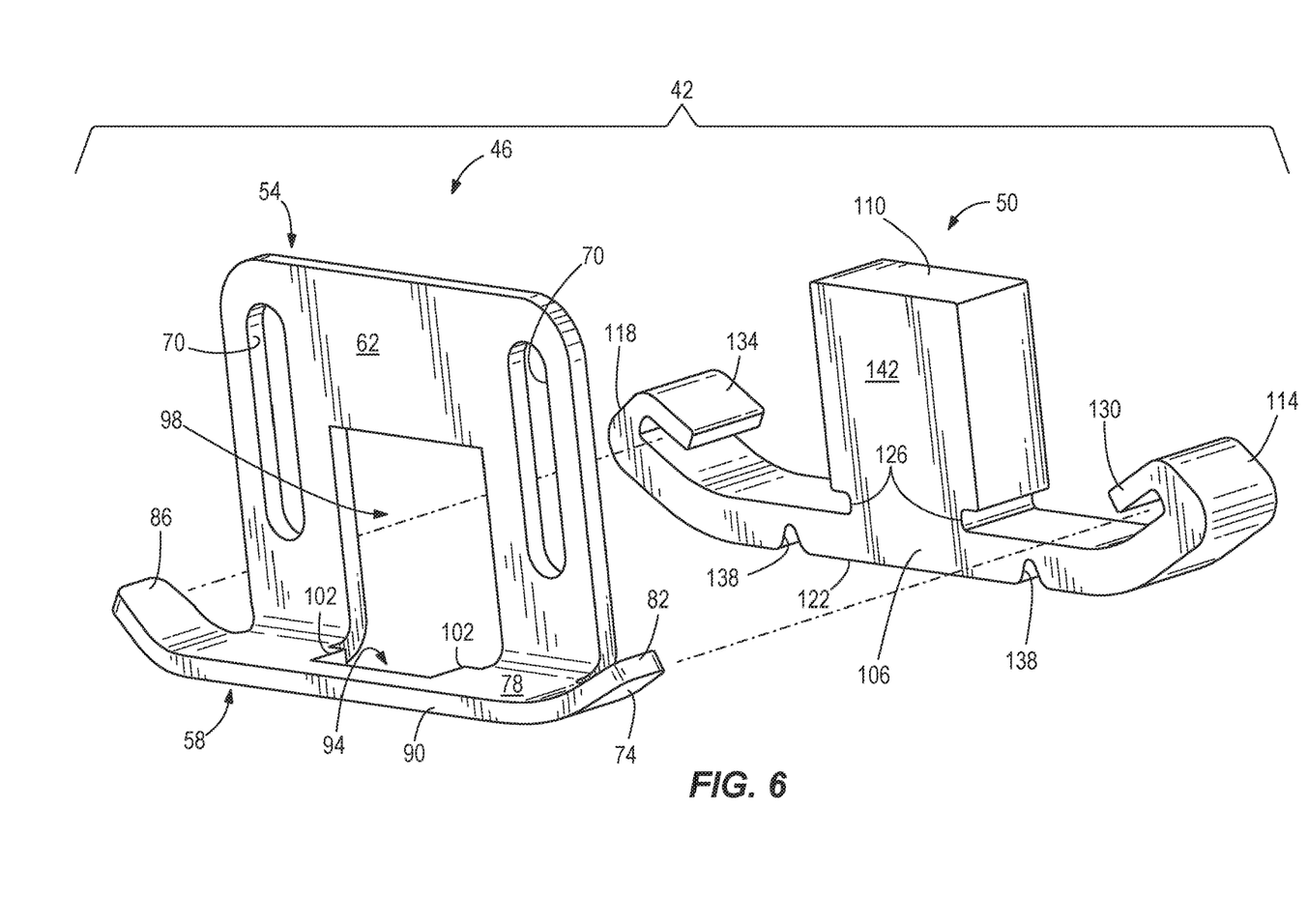
FIG. 6 is an exploded perspective view of the skid shoe assembly shown in FIG. 1.

With reference to FIG. 6, the bracket 46 further includes a first opening 94 and a second opening 98. The openings 94, 98 are configured to receive a portion of the insert 50 to at least partially restrict movement of the insert 50 relative to the bracket 46. As shown in the illustrated embodiment, the openings 94, 98 are centrally positioned between the elongated apertures 70. The first opening 94 is formed in the support portion 58. The second opening 98 is formed in the mounting portion 54. The openings 94, 98 are also connected to each other to form a continuous opening in the bracket 46. Two tabs 102 extend inward from the support portion 58 to partially narrow the first opening 94 of the support portion 58. Each tab 102 engages the insert 50 to facilitate coupling the insert 50 to the bracket 46.

With reference to FIGS. 3 and 4, the illustrated insert 50 includes an elongated body 106 and a head 110 extending from the elongated body 106. The elongated body 106 extends generally parallel to the support portion 58 of the bracket 46. The elongated body 106 includes a first end section 114, a second end section 118, and a central section 122 located between the first and second end sections 114, 118. The central section 122 of the elongated body 106 is generally planar such that, when mounted to the snow thrower 10, the central section 122 is oriented generally parallel to the ground surface. Additionally, the central section 122 generally extends parallel to the central section 90 of the support portion 58. The first and second end sections 114, 118 of the elongated body 106 extend outwardly from and are angled relative to the central section 122. The illustrated end sections 114, 118 are oriented at similar angles as that of the first and second end sections 82, 86 of the support portion 58. Accordingly, the first and second end sections 114, 118 of the elongated body 106 extend generally parallel to the first and second end sections 82, 86 of the support portion 58, respectively.

The head 110 extends generally perpendicular from the elongated body 106. The head 110 is shaped and sized to be received within the first and second openings 94, 98 of the bracket 46. The head 110 is captured between the auger housing 34 and the bracket 46 when the head 110 is received in the openings 94, 98. In the illustrated embodiment, the head 110 has a generally square profile that matches the shape of the second opening 98. The head 110 further includes a pair of notches 126 proximate the elongated body 106. Each notch 126 is appropriately dimensioned to receive one of the tabs 102 extending from the support portion 58. The tabs 102 fit in the notches 126 to help align the insert 50 with the bracket 46 and to inhibit vertical movement of the insert 50 relative to the bracket 46. Alternatively, the head 110 and the notches 126 may have any number of different shapes, provided the head 110 and the notches 126 have a portion that is at least partially received and engaged with the bracket 46.

The illustrated insert 50 also includes a first lip 130 and a second lip 134. The lips 130, 134 extend from the elongated body 106 and wrap over edges of the support portion 58 of the bracket 46. More specifically, the first lip 130 wraps over the first end section 82 of the support portion 58, and the second lip 134 wraps over the second end section 86 of the support portion 58. The first and second lips 130, 134 form hook-like members that extend from the bottom surface 74 to the top surface 78 of the support portion 58. As a result, the first and second end sections 114, 118 of the insert 50 are restricted from bending relative to the first and second end sections 82, 86 of the support portion 58.

The insert 50 further includes two V-shaped slots 138 formed in the elongated body 106. Each V-shaped slot 138 extends in a transverse direction through the elongated body 106. The V-shaped slots 138 reduce the total surface area of the elongated body 106 that engages the ground surface. Subsequently, the amount of friction between the ground surface and the elongated body 106 is also reduced. The V-shaped slots 138 are also wear indicators that help a user visually identify when the insert 50 should be replaced. Although the illustrated elongated body 106 includes V-shaped slots 138, in other embodiments, fewer of more V-shaped slots 138 may be formed in the body 106. In some embodiments, the V-shaped slots 138 may be omitted or alternatively shaped.

Figure 5:
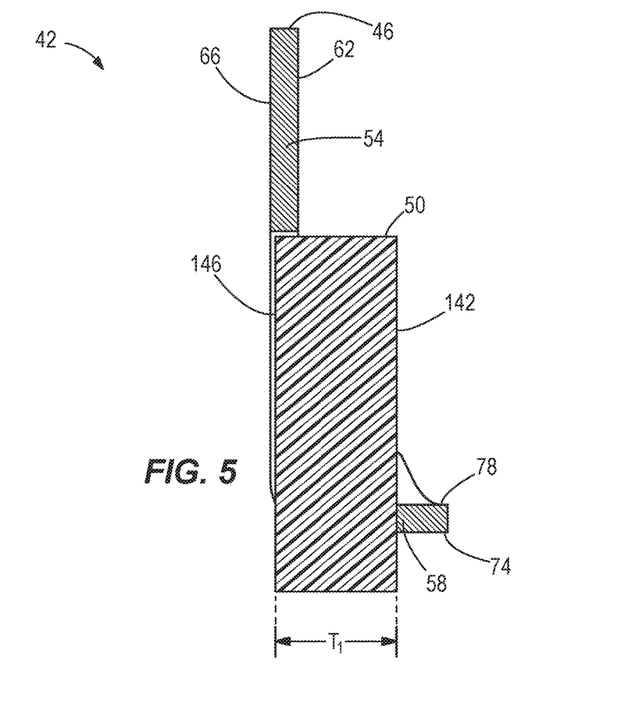
FIG. 5 is a cross-sectional view of the skid shoe assembly taken along section line 5-5 of FIG. 3.

With reference to FIG. 5, the head 110 and the elongated body 106 of the insert 50 define a pair of identical planar faces 142, 146. The planar faces 142, 146 define a uniform thickness T1 extending therebetween. As noted above, the uniform thickness T1 can be achieved by slicing the insert 50 from an elongated extrusion. When coupled to the bracket 46, the first planar face 142 abuts the support portion 58, and the second planar faces 146 is substantially flush with the rear face 66 of the mounting portion 54. Accordingly, the support portion 58 wraps around three sides of the head 110 to partially surround the insert 50. The insert 50 is then secured to the bracket 46 by mounting the bracket 46 to the auger housing 34 (or other suitable structure) to capture the insert 50 between the bracket 46 and the auger housing 34. In this state, the insert 50 is not removable from the auger housing 34. When the bracket 46 is disconnected from the auger housing 34, the insert 50 is removable from the auger housing 34.

To assemble the skid shoe assembly 42, the insert 50 is slid onto the bracket 46 before the bracket 46 is mounted to the auger housing 34 (or other suitable structure). In particular, the head 110 is slid through the second opening 98 and into the first opening 94 of the bracket 46 until the first planar face 142 of the insert 50 abuts the support portion 58. As the head 110 is slid into the first opening 94, the notches 126 of the head 110 receive the tabs 102 of the support portion 58. Additionally, the first and second end sections 114, 118 of the insert 50 slide over the first and second end sections 82, 86 of the support portion 58. Accordingly, the first and second lips 130, 134 wrap around the first and second end sections 82, 86 of the support portion 58. At this point, the insert 50 is received by the bracket 46, and the bracket 46 can be mounted to the auger housing 34. The insert 50 remains coupled to the bracket 46 without requiring a fastener (e.g., a bolt, a pin, etc.) to extend through the insert 50 and/or directly connect the insert 50 to the bracket 46.

The bracket 46 is coupled to the auger housing 34 by the mounting portion 54. In particular, the bracket 46 is secured to the auger housing 34 by threaded fasteners (e.g., bolts) extending through the elongated apertures 70 of the mounting portion 54. When the bracket 46 is secured to the auger housing 34, a portion (e.g., the head 110) of the insert 50 is captured between the bracket 46 and the auger housing 34. As a result, the insert 50 is prohibited from being removed from the bracket 46.

When the insert 50 is coupled to the bracket 46 and the bracket 46 is mounted to the auger housing 34, movement of the insert 50 is restricted. The support portion 58 wraps around the head 110 to inhibit horizontal movement of the insert 50. The notches 126 of the head 110 receive the tabs 102 of the support portion 58 to inhibit vertical movement of the insert 50. Similarly, the first and second lips 130, 134 of the insert 50 wrap around the end sections 82, 86 of the bracket 46 to inhibit vertical movement of the insert 50.

In operation, the skid shoe assemblies 42 facilitate moving the snow thrower 10 over the ground surface. The skid shoe assemblies 42, rather than the auger housing 34 (FIG. 1), engage the ground surface to reduce defacing or marring the ground surface. The skid shoe assemblies 42 also space the auger housing 34 slightly apart from the ground surface to reduce the possibility of leaving rust stains on the ground surface when the snow thrower 10 is stored.

If the insert 50 becomes worn or damaged, the insert 50 may be easily removed and replaced by disconnecting the bracket 46 from the auger housing 34, sliding the insert 50 off of the bracket 46, and sliding a new insert onto the bracket 46.

Figure 7:
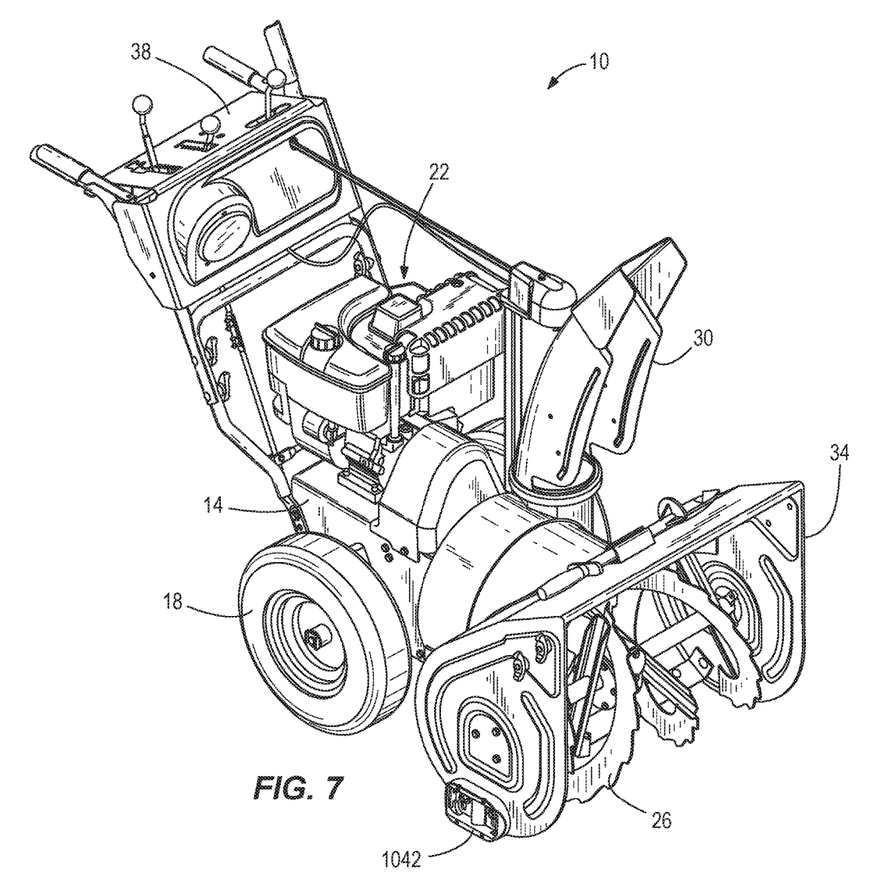
FIG. 7 is a front perspective view of a snow thrower including another skid shoe assembly.

FIG. 7 illustrates the snow thrower 10 having two alternative skid shoes 1042 (only one of which is shown in FIG. 7). The skid shoes 1042 are mounted on opposing sides of the auger housing 34. The skid shoe assemblies 1042 facilitate moving (e.g., sliding) the snow thrower 10 along the ground surface during operation. The skid shoe assemblies 1042 are substantially identical and only one of the assemblies 1042 is described in detail below.

Figure 8:
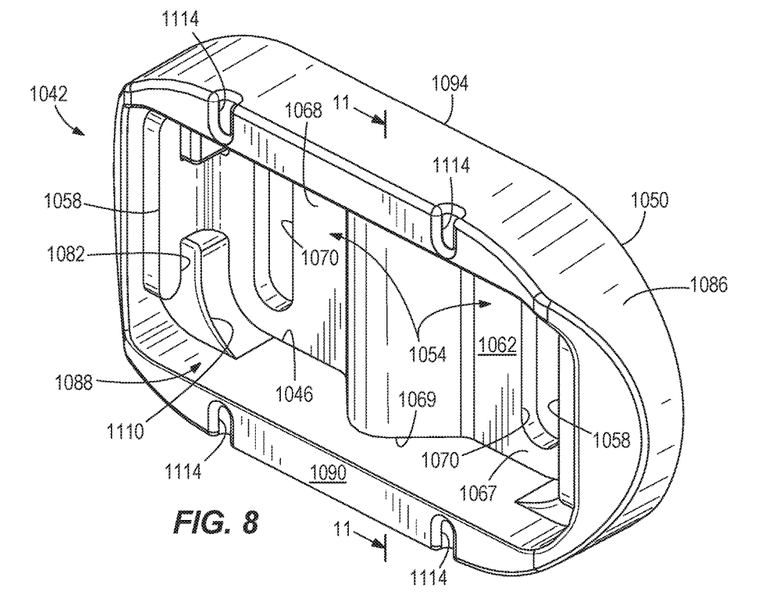
FIG. 8 is a perspective view of the skid shoe assembly shown in FIG. 7.

As shown in FIG. 8, the illustrated skid shoe assembly 1042 includes a bracket 1046 and a replaceable insert 1050. The bracket 1046 is configured to couple to the auger housing 34. The replaceable insert 1050 is received by the bracket 1046 and configured to engage the ground surface. The bracket 1046 provides structure and support to the skid shoe assembly 1042, whereas the insert 1050 is configured to slide across the ground surface without defacing or marring the ground surface. In the illustrated embodiment, the bracket 1046 and the insert 1050 are composed of different materials. The bracket 1046 is composed of a relatively harder, first material, while the insert 1050 is composed of a relatively softer, second material. For example, the bracket 1046 is preferably composed of metal (e.g., steel, etc.), and the insert 1050 is preferably formed of plastic (e.g., nylon, polyethylene, ABS, PVC, etc.). In some embodiments, the insert 1050 may be molded from plastic.

Figure 10:
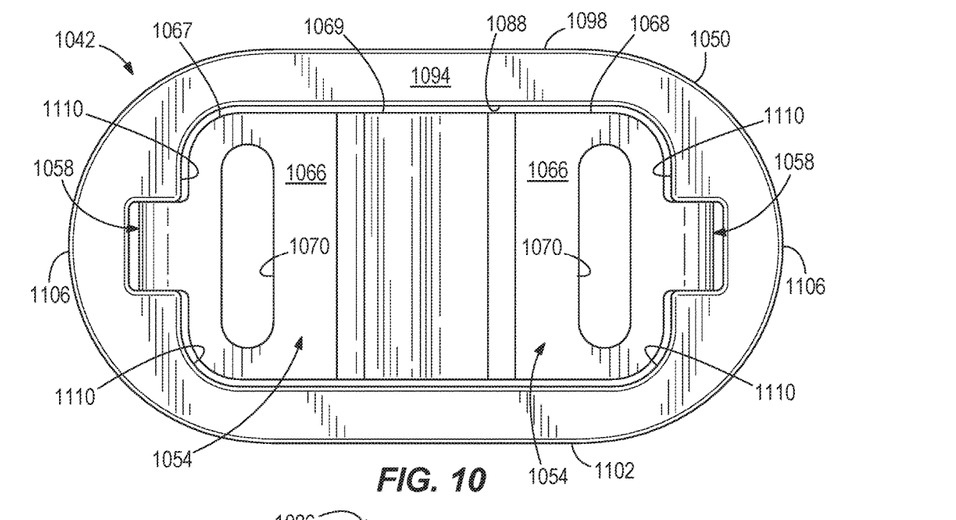
FIG. 10 is a rear plan view of the skid shoe assembly shown in FIG. 7.

The illustrated bracket 1046 includes a mounting portion 1054 and a pair of support portions 1058. The mounting portion 1054 is configured to couple to the snow thrower 10 and, more particularly, the auger housing 34. The mounting portion 1054 includes a front face 1062 and a rear face 1066 (FIG. 10) that is opposite the front face 1062. The rear face 1066 abuts and directly contacts the auger housing 34 when the bracket 1046 is coupled to the snow thrower 10. The mounting portion 1054 further includes a first planar body 1067 defining a plane, a second planar body 1068 coplanar with the plane, and a V-shaped protrusion 1069 interconnecting the first planar body 1067 and the second planar body 1068. The V-shaped protrusion 1069 extends away from the plane and provides structural support for the bracket 1046 and the insert 1050. Each planar body 1067, 1068 includes an elongated aperture 1070 that extends through the front and rear faces 1062, 1066. Each elongated aperture 1070 receives a suitable fastener (e.g., a bolt) to couple the bracket 1046 to the auger housing 34 of the snow thrower 10. The apertures 1070 are elongated to allow vertical adjustment of the bracket 1046 relative to the auger housing 34. Although the illustrated protrusion 1069 is V-shaped, in other embodiments, the protrusion 1069 may be alternatively shaped (e.g., U-shaped, W-shaped, etc.) so as long as the protrusion 1069 extends away from the plane.

Figure 9:
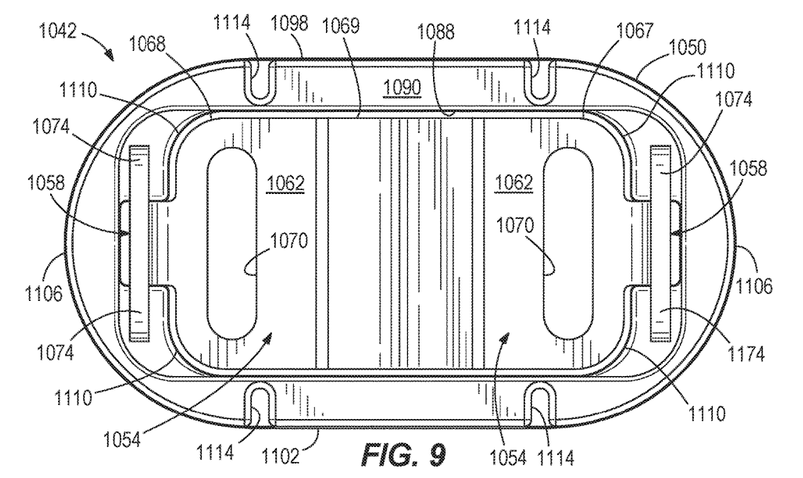
FIG. 9 is a front plan view of the skid shoe assembly shown in FIG. 7.

With reference to FIGS. 8 and 9, each support portion 1058 of the bracket 1046 interfaces with and supports the insert 1050 when the bracket 1046 and the insert 1050 are coupled together. In the illustrated embodiment, each support portion 1058 extends generally perpendicular from the mounting portion 1054, such that each support portion 1058 is bent relative to the mounting portion 1054 to achieve the desired orientation. In particular, each support portion 1058 is bent toward the front face 1062 of the bracket 1046 so that the support portions 1058 extend from the plane defined by the mounting portion 1054 in the same direction as the V-shaped protrusion 1069. Accordingly, the bracket 1046 is formed (e.g., machined) as a unitary member. Although the illustrated bracket 1046 is constructed as a single piece, in other embodiments, the bracket 1046 may be constructed from separate pieces that are secured (e.g., welded) together.

Furthermore, each support portion 1058 of the bracket 1046 includes a pair of tabs 1074 extending from the support portion 1058. The tabs 1074 extend in opposing vertical directions so that each support portion 1058 is a generally T-shaped member. Each tab 1074 defines support surfaces 1078 (FIG. 12) to at least partially support the replaceable insert 1050, and stop surfaces 1082 to abut a portion of the insert 1050 (FIG. 8). When the bracket 1046 and insert 1050 are coupled together, the support surfaces 1078 inhibit vertical movement of the insert 1050, whereas the stop surfaces 1082 (in tandem with the auger housing 34) inhibit horizontal movement of the insert 1050.

With reference to FIGS. 9-12, the illustrated insert 1050 includes an annular body 1086 having a central aperture 1088. The central aperture 1088 receives the bracket 1046 so that the annular body 1086 is disposed around the mounting portion 1054 of the bracket 1046. The annular body 1086 has a front face 1090 (FIG. 9), a rear face 1094 (FIG. 10), a first ground contact member 1098, a second ground contact member 1102, and two arcuate members 1106 interconnecting the first and second ground contact members 1098, 1102. The central aperture 1088 extends through the front face 1090 and the rear face 1094. The first and second ground contact members 1098, 1102 are both linear sections that are configured to engage the ground surface. The ground contact members 1098, 1102 are located on the annular body 1086 opposite from each other. As such, the insert 1050 can be positioned in a first orientation, in which the first ground contact member 1098 faces and engages the ground surface, or in a second orientation, in which the second ground contact member 1102 faces and engages the ground surface. In the illustrated embodiment, the insert 1050 is movable between the two orientations by rotating insert 1050 180 degrees relative to the bracket 1046 (while the insert 1050 is disconnected from the bracket 1046).

The annular body 1086 also includes shoulders 1110 formed at corners between the contact members 1098, 1102 and the arcuate members 1106. The shoulders 1110 extend inwardly from an inner periphery of the annular body 1086 and provide interfaces for the tabs 1074 of the support portions 1058. Each shoulder 1110 has a rear face that is substantially flush with the rear face 1094 of the insert 1050 and a front face that is inset from the front face 1090 of the insert 1050. As a result, the support portions 1058 are positioned within, and do not extend beyond, the central aperture 1088 of the annular body 1086.

Referring to FIGS. 8 and 9, the insert 1050 further includes wear indicators 1114 to provide a visual indication to a user when the insert 1050 should be re-oriented or replaced. The illustrated wear indicators 1114 are disposed on the first and second ground contact members 1098, 1102. Generally, the wear indicators 1114 are cavities formed on the front face 1090 and the outer periphery of the annular body 1086. As each of the contact members 1098, 1102 slide across the ground surface, the material of the annular body 1086 gradually wears away, thereby decreasing the size (e.g., height or depth) of the wear indicators 1114. Once the wear indicators 1114 reach a certain minimum size, the user knows to re-orient or replace the insert 1050.

As material wears away from the first and second contact members 1098, 1102, the contact members 1098, 1102 may also loose strength. The V-shaped protrusion 1069 of the bracket 1046, however, is positioned within the central aperture 1088 of the insert 1050 to engage and support the inner periphery of the annular body 1086. Particularly, when one or both of the contact members 1098, 1102 become thinner, the contact members 1098, 1102 may deflect inwardly toward the bracket 1046. The V-shaped protrusion 1069 is shaped and positioned to support each contact member 1098, 1102 as the contact members 1098, 1102 deflect, thereby maintaining the structural integrity and general shape of the annular member 1086.

Figure 11:
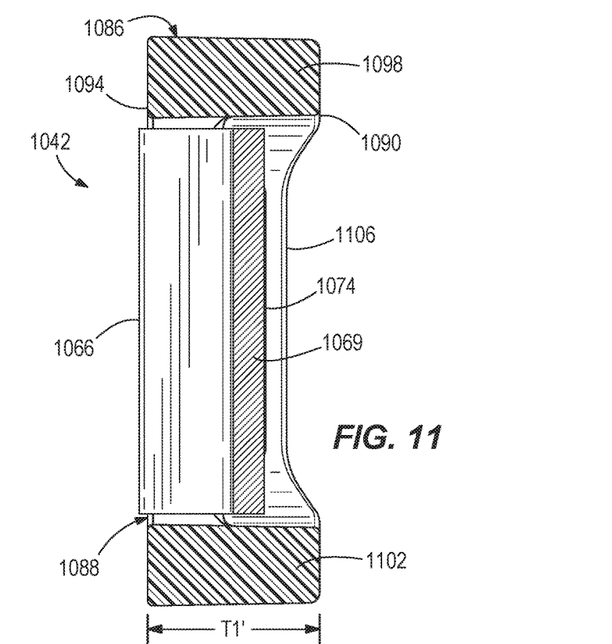
FIG. 11 is a cross-sectional view of the skid shoe assembly taken along section line 11-11 of FIG. 8.

With reference to FIG. 11, the rear face 1066 of the bracket 1046 extends slightly beyond, but is nearly flush with the rear face 1094 of the insert 1050 when the insert 1050 is coupled to the bracket 1046. Furthermore, the illustrated tabs 1174 are disposed on the interior of the annular body 1086 without extending beyond a maximum thickness T1' of the annular body 1086. The thickness T1' is defined by the distance between the front face 1090 and the rear face 1094 of the insert 1050. Additionally, the V-shaped protrusion 1069 extends away from rear face 1066 of the bracket 1046 without extending beyond the front face 1090 of the insert 1050. As such, the entire bracket 1046 can be contained within a volume defined by the insert 1050.

Figure 12:
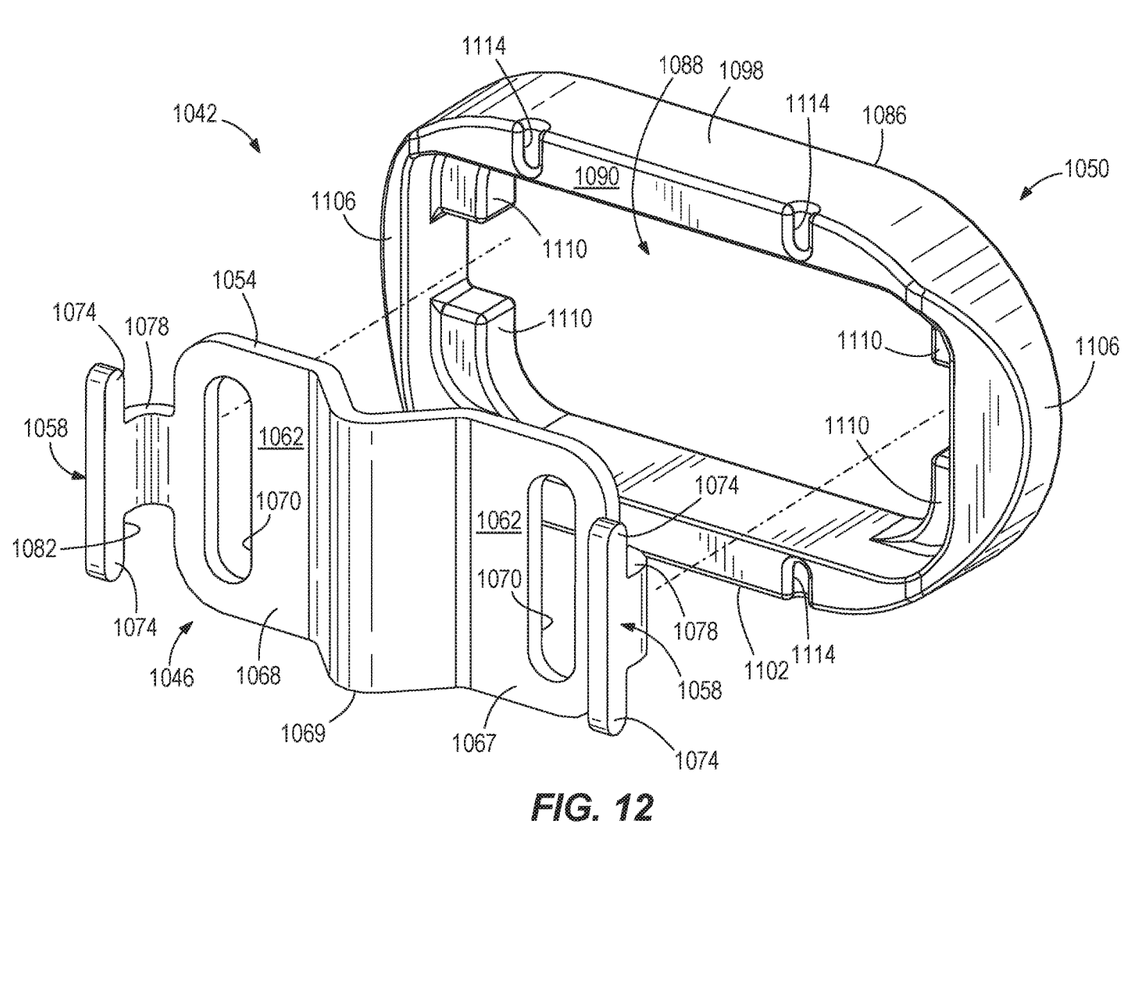
FIG. 12 is an exploded perspective view of the skid shoe assembly shown in FIG. 7.

To assemble the skid shoe assembly 1042, the bracket 1046 is slid into the central aperture 1088 of the insert 1050 before the bracket 1046 is mounted to the auger housing 34 (or other suitable structure). In particular, the bracket 1046 is slid through the annular body 1086 until the tabs 1074 of the bracket 1046 abut the shoulders 1110, causing the support surfaces 1078 and stop surfaces 1082 of the tabs 1074 to engage the shoulders 1110. A secondary fastener (e.g., a bolt, a pin, etc.) is not used to directly secure the bracket 1046 and the insert 1050 together. At this point, the insert 1050 is received by the bracket 1046, and the bracket 1046 can be mounted to the auger housing 34.

The bracket 1046 is then coupled to the auger housing 34 by the mounting portion 1054. In particular, the bracket 1046 is secured to the auger housing 34 by threaded fasteners (e.g., bolts) extending through the elongated apertures 1070 of the mounting portion 1054. When the bracket 1046 is secured to the auger housing 34, portions (e.g., the shoulders 1110) of the insert 1050 are captured between the bracket 1046 and the auger housing 34. As a result, the insert 1050 is prohibited from being removed from the bracket 1046 without first disconnecting the bracket 1046 from the auger housing 34. Furthermore, when the insert 1050 is coupled to the bracket 1046 and the bracket 1046 is mounted to the auger housing 34, movement of the insert 1050 relative to the bracket 1046 is inhibited. Each support portion 1058 interfaces directly with the shoulders 1110 to inhibit horizontal and vertical movement of the insert 1050.

In operation, the skid shoe assemblies 1042 facilitate moving the snow thrower 10 over the ground surface. The skid shoe assemblies 1042, rather than the auger housing 34 (FIG. 1), engage the ground surface to reduce defacing or marring the ground surface. The skid shoe assemblies 1042 also space the auger housing 34 slightly apart from the ground surface to reduce the possibility of leaving rust stains on the ground surface when the snow thrower 10 is stored.

If the insert 1050 becomes worn or damaged, the insert 1050 may be easily removed and replaced by disconnecting the bracket 1046 from the auger housing 34, sliding the insert 1050 off of the bracket 1046, and sliding a new insert 1050 onto the bracket 1046.

Although the skid shoe assemblies 42, 1042 are discussed above with reference to a snow thrower, it should be readily apparent that the skid shoe assemblies 42, 1042 are usable with other types of utility machines.

Various features and advantages of the invention are set forth in the following claims.

What is claimed is:

1. A skid shoe assembly for use on a snow thrower, the skid shoe assembly comprising:
    a bracket having a mounting portion configured to couple to the snow thrower and a support portion extending generally perpendicular from the mounting portion; and
    a replaceable insert composed of a plastic material, the insert including an elongated body extending generally parallel to the support portion and configured to engage a ground surface,
    wherein the insert further includes a head extending from the elongated body, and wherein the head includes a notch that receives a portion of the support portion of the bracket,
    wherein the bracket further includes an opening formed in the support portion, and wherein the head extends through the opening,
    wherein the bracket further includes a second opening formed in the mounting portion, and wherein the head is received in the second opening.

2. The skid shoe assembly of claim 1, wherein the bracket is composed of a harder material than the insert.

3. The skid shoe assembly of claim 2, wherein the bracket is composed of metal.

4. The skid shoe assembly of claim 1, wherein the bracket slideably receives the insert.

5. The skid shoe assembly of claim 1, wherein the insert further includes a lip extending from the elongated body, wherein the lip is configured to wrap over an edge of the support portion.

6. The skid shoe assembly of claim 5, wherein the lip is a first lip that wraps over a first end of the support portion, wherein the insert further includes a second lip extending from the elongated body, and wherein the second lip wraps over a second end of the support portion.

7. The skid shoe assembly of claim 1, wherein the support portion of the bracket includes a first end section, a second end section, and a central section located between the first and second end sections, wherein the central section is generally planar, and wherein the first end section and the second end section are angled relative to the central section.

8. The skid shoe assembly of claim 7, wherein the elongated body includes a first end section, a second end section, and a central section located between the first and second end sections, wherein the first end section of the elongated body extends generally parallel to the first end section of the support portion, wherein the second end section of the elongated body extends generally parallel to the second end section of the support portion, and wherein the central section of the elongated body extends generally parallel to the central section of the support portion.

9. The skid shoe assembly of claim 1, wherein the insert is coupled to the bracket without a fastener.

10. A skid shoe assembly for use on a snow thrower, the skid shoe assembly comprising:
    a bracket having a mounting portion configured to be coupled to the snow thrower and a support portion extending generally perpendicular from the mounting portion, the bracket being composed of a first material; and
    a replaceable insert including an elongated body extending generally parallel to the support portion and configured to engage a ground surface, the replaceable insert being composed of a second material that is softer than the first material,
    wherein the bracket includes a first opening formed in the support portion and a second opening formed in the mounting portion, wherein the insert includes a head extending from the elongated body, and wherein the head extends through the first opening and is received in the second opening.

11. The skid shoe assembly of claim 10, wherein the insert further includes a first lip and a second lip extending from the elongated body, wherein the first lip wraps over a first end of the support portion, and wherein the second lip wraps over a second end of the support portion.

12. A snow thrower comprising:
    a frame;
    a prime mover supported by the frame;
    a handle assembly coupled to frame;
    an auger housing coupled to the frame;
    an auger disposed in the auger housing, the auger being driven by the prime mover;
    a skid shoe assembly including
        a bracket having a mounting portion coupled to the auger housing and a support portion extending generally perpendicular from the mounting portion, and
        a replaceable insert having an elongated body extending generally parallel to the support portion and configured to engage the ground surface, a portion of the insert being captured by the bracket and the auger housing.

13. The snow thrower of claim 12, wherein the bracket is composed of a first material and the insert is composed of a second material that is softer than the first material.

14. The snow thrower of claim 13, wherein the first material is metal, and the second material is plastic.

15. The snow thrower of claim 12, wherein the replaceable insert is secured to the bracket when the bracket is coupled to the auger housing, and wherein the insert is removable from the bracket when the bracket is decoupled from the auger housing.

16. The snow thrower of claim 12, wherein the replaceable insert further includes a head extending from the elongated body, and wherein a portion of the head is captured between the bracket and the auger housing.

* * * * *